3,193,586
PROCESS FOR THE PRODUCTION OF UNSATURATED FATTY ALCOHOLS

Wilhelm Rittmeister, Erkrath-Unterbach, Germany, assignor to Dehydag, Deutsche Hydrierwerke G.m.b.H., Dusseldorf, Germany, a corporation of Germany
No Drawing. Filed Apr. 7, 1959, Ser. No. 804,595
Claims priority, application Germany, Aug. 22, 1955, D 21,132
9 Claims. (Cl. 260—638)

This application is a continuation-in-part of my prior application Serial No. 571,376, now abandoned.

This invention relates to a process of producing unsaturated fatty alcohols, and most particularly to a process of producing unsaturated fatty alcohols from unsaturated fatty acids or their esters by catalytic reduction with hydrogen.

The prior art discloses a variety of processes whereby unsaturated fatty acids or their esters can be transformed into the corresponding unsaturated fatty alcohols through catalytic reduction. These is no evidence, however, that any of these processes have been used to produce unsaturated fatty alcohols on a commercial scale. In fact, as recently at 1954, E. Hill, G. Wilson and E. Steinle reported in Ind. Eng. Chemistry, vol. 46, page 1917, that unsaturated fatty alcohols can be produced on a commerical scale only by reduction of unsaturated fatty acid esters with metallic sodium.

Similarly, H. Sauer and H. Adkins (Journal of the American Chemical Society, vol. 59, page 1, 1937) have reported their investigations relative to a catalytic reduction of unsaturated fatty acid esters in the liquid phase in the presence of catalyst containing primarily zinc and chromium. The results of these investigations showed that such a procedure is not satisfactory for commercial purposes because it involves very large quantities of catalyst, it requires a reaction period of from 7 to 11 hours and the yields of unsaturated alcohols do not exceed 68% of the theoretical yield.

German Patent No. 755,279 describes a process which comprises the use of copper-cadmium catalysts in the reduction of unsaturated fatty acids in the liquid phase to unsaturated alcohols. However, the reaction products formed thereby are impure and contain considerable quantities of free fatty acids and esters in addition to unsaturated alcohols. If the hydrogenation is continued, a substantial number of the double bonds become saturated, so that the yield of unsaturated alcohols is seriously reduced. Hence, this process is also unsuitable for use on a commercial scale.

Finally, German Patent 865,741 and U.S. Patent No. 2,374,379 describe a process for the production of unsaturated fatty alcohols from unsaturated fatty acids which comprises passing such fatty acids in the gaseous phase in admixture with hydrogen over zinc or cadmium-vanadium catalysts in lump form. This particular process has the advantage over the processes previously mentioned that the reaction product is practically free from esters and free unsaturated acids, but it has the disadvantage that the reaction product contains from 5 to 8% hydrocarbon impurities. The degree of purity required of fatty alcohols today makes the raw product undesirable, and purification of the raw product to the degree of purity required renders the cost of production too high in competition with the known sodium reduction process.

Thus, none of the known processes for the production of unsaturated fatty alcohols by catalytic reduction of unsaturated fatty acids or their esters have found their way into practical use by the chemical industry.

It is an object of the present invention to provide a process for the catalytic reduction of unsaturated fatty acids or their esters which produces virtually quantitative yields of unsaturated fatty alcohols.

Another object of the present invention is to provide a process for the catalytic reduction of unsaturated fatty acids or their esters which will produce unsaturated fatty alcohols of high purity.

Other objects and advantages of the present invention will become apparent as the description proceeds.

I have found that unsaturated fatty alcohols can be obtained with excellent yields and a high degree of purity by catalytic reduction of unsaturated fatty acids or their esters with hydrogen, provided certain critical conditions are maintained in the reaction system.

First, the starting materials must flow through a reaction space containing large amounts of a lumpy catalyst having a relatively low catalytic activity; in other words, the reaction space must be large in relation to the throughput of starting material per unit time. For example, the throughput of starting material should be about two to four times the volume of the reaction space per 24 hours. This may be accomplished by having about 8 times the volume of catalyst based on the starting material.

Second, large excesses of hydrogen must be used. Such large quantities of hydrogen are used that the ester is completely or almost completely vaporized. At the indicated pressures and temperatures such quantities of hydrogen are required that they amount to about 50 to 500 times the quantity which is theoretically needed for reduction of the fatty acid esters to saturated fatty alcohols. In industry this is accomplished by a suitable recycling of hydrogen through the hydrogenation apparatus under the reaction pressure. Only the quantity of hydrogen consumed in the hydrogenation of the ester is replaced by fresh hydrogen. A high reaction pressure is advantageous for the vaporization of the ester or the fatty alcohol because in the high pressure range the vapor pressure of these materials increases with increasing pressure. In other words, recycling of the same effective volume of hydrogen at 500 atmospheres gauge vaporizes more ester than at 200 atmospheres gauge. However, if the recycled effective gas volume is converted to the normal volume, the amount of hydrogen recycled at 500 atmospheres gauge is considerably greater than the quantity at 200 atmospheres gauge.

The reaction thus takes place in the vapor phase, wherein the ester, hydrogen and methanol pass over the lumpy catalyst as a vapor mixture. In order to accomplish this result, in a simple manner, a preheated ester and methanol mixture may be brought together in a T-joint. The hydrogen thereby entrains the vapors of the ester. While it is recognized that such esters as coconut fatty acid methyl ester could not be made to boil at the above conditions, the ester may nevertheless be completely vaporized. The theoretical considerations for this are as follows.

It is well recognized that when a foreign gas atmosphere occupies the space above a liquid, so much of the liquid vaporizes until the partial pressure of the liquid vapor in the atmosphere of the foreign gas corresponds to the vapor pressure of the liquid at the prevailing temperature. The vapor pressure of the liquid is independent of the external pressure at low pressure ranges. At higher pressures, the vapor pressure is higher than at lower pressures. Therefore, by passing a sufficient volume of hydrogen gas over the surface of a liquid ester, the entire amount may be vaporized by continuous entrainment and carrying away of the vapor above the liquid. To illustrate as theorized above that the operation actually takes place at the conditions shown, the following experiments were carried out with coconut fatty acid methyl ester:

2.5 liters coconut fatty acid methyl ester were heated to 240° C. at 250 atmospheres gauge, and the vapor formed thereby was entrained by a continuously flowing stream of 45 cubic meters, at standard temperature and pressure, of hydrogen per hour. The vapor mixture formed thereby was passed under the same pressure and temperature conditions first into a liquid separator and subsequently into a hydrogenation reaction chamber.

(1) Under these conditions, 0.5 liter of ester remained in the liquid separator in liquid form, whereas the remaining 2.0 liters of coconut fatty acid methyl ester passed over into the reaction chamber in vapor form together with the hydrogen.

(2) Under the above pressure conditions, 2.5 liters of coconut fatty acid methyl ester and 1.5 liters methanol, together with 40 cubic meters of hydrogen, were heated to 240° C. and passed through a liquid separator into a hydrogenation reaction chamber at the above-indicated hourly rate. In this case about 0.25 liter of ester remained in the separator in liquid form, whereas the remainder of the ester, together with the methanol and the hydrogen, passed into the reaction chamber in vapor form.

(3) Coconut fatty acid methyl ester, methanol and hydrogen were heated under the temperature and pressure conditions above indicated, except that 2.5 liters of methanol were added instead of 1.5 liters. Under these conditions, the fatty acid methyl ester was completely vaporized and no liquid ester at all separated out in the separator.

These tests conclusively show that the fatty acid ester substantially completely vaporized regardless of the pressure conditions, if a sufficient amount of methanol is added to the hydrogen entrainment gas.

Such operation with high-boiling point materials in the vapor phase or gas phase at high pressures and high temperatures is illustrated, for example, in Ullmans Encyklopadie der Technichen Chemie, published by Urban and Schwarzenberg, Munich, Germany (1956), vol. 7, p. 446, where the production of fatty alcohols is discussed.

As previously stated, the starting material should be passed through the reaction space and through the lumpy contact catalyst together with 50 to 500 times the amount of hydrogen theoretically required to give a complete conversion of fatty acid into fatty alcohol. The optimum amount of hydrogen has been found to be 200 to 300 times the theoretical amount. The hydrogen is preferably recycled through the hydrogenation apparatus, and the proper proportion is maintained by continuously adding fresh hydrogen to the cycle in an amount corresponding to that consumed in the reduction reaction.

Third, it is necessary to pass substantial amounts of low-molecular alcohols containing from 1 to 4 carbon atoms through the reaction space together with the starting material and the relatively large quantities of hydrogen. The quantity of low-molecular alcohol should be at least equal to the quantity of starting material, i.e., unsaturated fatty acid or esters thereof, but preferably from 2 to 4 times the quantity of starting material.

Finally, the pressure in the reaction vessel must be at least 100 atmospheres gauge, preferably above 200 atmospheres gauge, and the reaction temperature must be between 250 and 350° C.

Suitable catalysts for the process according to my invention are low activity zinc containing catalysts especially zinc-chromium compounds, zinc-barium-chromium compounds and zinc-cadmium-chromium compounds, but also zinc-magnesium-chromium, zinc-vanadium, cadmium-vanadium, zinc-cadmium-vanadium and zinc-cadmium-barium-vanadium catalysts have proved to be effective. In producing such contact catalysts, the chromium is employed in the form of free chromic acid or chromates, and the vanadium in the form of free vanadic acid or vanadates.

Thus the composition of the zinc catalysts may be varied broadly. For example it is possible to use pure zinc chromite as a catalyst. Where esters of the unsaturated fatty acids are used as starting materials such as for instance in Example 4, the chrome content of the catalysts may be reduced very strongly. In such a case it may even be possible to apply catalysts, obtained by precipitating pure zinc oxide on a carrier such as pumice stone. Of course, if free unsaturated carboxylic acids are to be reduced to unsaturated fatty alcohols, it is necessary to stabilize the zinc against the attacks of the free fatty acids by partly reacting it with chromic or vanadic acid respectively. Then it may be satisfactory if, e.g., ¼ or ½ mol of the zinc and of the barium added is bound to the chromic acid in preparing the contact.

For example, 12 g./mol zinc oxide and 2 g./mol barium hydroxide are mixed. To the mixture 700 to 800 g. water are added until a thin pulp is obtained. Then a solution of 7 g./mol chromic acid ($CrO_3$) in 700 g. water is added and stirred up. The ready mixture is dried and formed into pieces or tablets respectively. The zinc or barium chromate respectively is reduced to the chromite in the hydrogen stream by heating up the reaction furnace to the desired reaction temperatures.

Suitable catalysts may be obtained for instance by treating zinc oxide and barium oxide with a solution of ammonium chromate or ammonium bichromate respectively. Furthermore, useful catalysts may be obtained by mixing solutions of zinc nitrate and eventually barium nitrate with a solution of ammonium chromate, drying and then heating the obtained precipitation.

Thus, it is possible to apply all the known methods for preparing the catalysts, which contain zinc as an oxide and/or a chromite and/or a vanadide respectively. In preparing the catalysts a barium, cadmium or magnesium compound respectively may be used as an activator. The essential element of these catalysts in the zinc, as additions chrome and barium are preferred in the form of the compounds described above.

The starting material for the process according to the present invention may be a free unsaturated fatty acid or esters therof formed with low-molecular monovalent saturated alcohols containing from 1 to 4 carbon atoms. Particularly suitable for this purpose are the methyl esters of unsaturated fatty acids dissolved in methanol. However, the ethyl, propyl or butyl esters of unsaturated fatty acids may also be used as starting materials. Similarly, a mixture of free unsaturated fatty acids and low-molecular alcohols may be used as the starting materials. I have found that particularly good results are obtained when using the free fatty acid in the presence of methyl alcohol.

The low molecular weight alcohol which I utilize as a diluent may be the same as that which has been used to form the fatty acid ester or it may be a different alcohol. The use of the same low molecular weight alcohol is advantageous in that no separation of the diluent alcohol from that released from the ester by the hydrogenation is required at the end of the process. Thus, when I hydrogenate a methyl ester of a fatty acid I prefer to use methyl alcohol as a diluent. Similarly when I hydrogenate the propyl ester of a fatty acid, I prefer to use propyl alcohol as the diluent. Most advantageous, however, are free unsaturated fatty acids dissolved in methanol. In this respect, the process in accordance with the present invention has a distinct and striking advantage over the known sodium reduction process; free unsaturated fatty acids can not be converted into the corresponding unsaturated fatty alcohols by reduction with metallic sodium.

The novel process above described is primarily applicable to the production of unsaturated fatty alcohols containing a single double bond from unsaturated fatty acids comprising a single double bond. Unsaturated fatty acids containing more than one double bond or natural fatty acid mixtures or their corresponding esters which contain substantial amounts of multiple unsaturated fatty acids, such as linseed oil fatty acids, soybean oil fatty acids or soybean oil fatty acid methyl esters, are transformed to a substantial degree into unsaturated fatty alcohols containing a single double bond. Since some multiple unsaturated fatty acids, such as soybean oil fatty acids, tend to polymerize under the reaction conditions prevailing during the present process and temporarily inactivate the contact catalyst, it is advantageous to harden such fatty acids or their esters to an iodine number of 90 to 100 under the usual mild conditions prior to subjecting them to the catalytic reduction process herein described.

The following examples will further illustrate the present invention and enable others skilled in the art to understand my invention more completely. There is, however, no intention on my part to limit the invention to the particular materials and conditions recited in these examples.

*Example I*

1.4 liters per hour sperm oil fatty acid having an iodine number of 67, an acid number of 211 and a saponification number of 213 together with 2.8 liters per hour methanol and 50 cubic meters per hour hydrogen (calculated at standard temperature and pressure) were passed over 14 liters of a zinc-barium-chromium contact catalyst at a temperature of 285° C. and a pressure of 250 atmospheres gauge. The reaction product was freed from methanol by washing or distillation. It had an acid number of zero, a saponification number of 0.7, an iodine number of 68.2, an OH-number of 222 and contained only 0.6% components not capable of sulfonation. The yield of reaction product was 98% of the theoretical yield.

*Example II*

1.25 liters per hour oleic acid having an iodine number of 85.7 and an acid number of 196, together with 2.75 liters per hour methanol and 50 cubic meters per hour hydrogen (calculated at standard temperature and pressure) were passed over 14 liters of the contact catalyst described in Example I at a temperature of 280° C. and a pressure of 260 atmospheres gauge. After separation of the methanol, the reaction product had an acid number of zero, a saponification number of 1.2, an iodine number of 86.3 and a hydrocarbon content of 0.9%. The yield of unsaturated alcohols was 99% of the theoretical yield.

*Example III*

4 liters per hour of a mixture composed of 1 part tallow oil fatty acid having an acid number of 204 and an iodine number of 50.4 and 2 parts butanol were passed together with 55 cubic meters per hour hydrogen (calculated at standard temperature and pressure) over 14 liters of a contact catalyst produced only from zinc oxide and chromic acid. After distilling off the butanol, the reaction product was found to be an unsaturated fatty alcohol having the following characteristic values: Saponification number=1.0, acid number=0, iodine number=43.5, hydroxyl number=207, unsulfonatable matter=1.2%. The yield was 98.5% of the theoretical yield.

*Example IV*

1.5 liters per hour of sperm oil fatty acid methyl ester and 3 liters per hour methanol together with 60 cubic meters per hour hydrogen (calculated at standard temperature and pressure) were passed at 310° C. and 275 atmospheres gauge over 14 liters of a contact catalyst produced from zinc oxide and vanadic acid. After removal of the methanol, the reaction product was found to be an unsaturated fatty alcohol product having the following characteristic constants: Saponification number=5.9, iodine number=43.4, hydroxyl number=212, and content of unsulfonatable matter=2.1%. The yield was 98% of the theoretical yield.

*Example V*

1.7 liters per hour of tallow oil fatty acid having an acid number of 205 and an iodine number of 51.4 and 4 liters per hour ethyl alcohol together with about 50 cubic meters hydrogen (calculated at standard conditions) were passed over 14 liters of the contact catalyst described in Example I at 290° C. and 260 atmospheres gauge. After separation of the ethanol, the reaction product was found to be an unsaturated fatty alcohol product having the following characteristic values: Saponification number=1.4, iodine number=51.5, hydroxyl number=212.5, and content of unsulfonatable matter=0.8%. The yield was 98% of the theoretical yield.

*Example VI*

1.2 liters per hour tall oil fatty acid and 3.6 liters per hour methanol together with about 50 cubic meters of hydrogen (calculated at standard conditions) were passed at 300° C. and 250 atmospheres gauge over 14 liters of a contact catalyst consisting half of zinc-chromite and half of zinc-oxide and containing in addition 5% barium chromite. The tall oil fatty acid used herein contained about 2% resin fatty acids and had the following characteristic values: Acid number=196.6, saponification number=196.6, iodine number=127.2. After distilling off the methanol, the reaction product was found to be an unsaturated fatty alcohol product having the following characteristic values: Saponification number=3.4, hydroxyl number=198, iodine number=102, and unsulfonatable matter=1.0%. The yield was 97.8% of the theoretical yield.

*Example VII*

1.5 parts by volume per hour of cotton oil fatty acid having an acid number of 205 and an iodine number of 112.5, together with 3.0 parts by volume per hour of methanol and 55 cubic meters per hour of hydrogen (calculated at standard temperature and pressure) were passed at 295° C. and 270 atmospheres gauge over 14 parts by volume of a contact catalyst consisting of zinc, cadmium, barium and chromium in molar ratio of 5:5:4:7; in the production of the catalyst, zinc, cadmium and barium were used in the form of their oxides and chromium in the form of chromic acid. After removal of methanol by distillation, the reaction product was found to be an unsaturated fatty alcohol product having the following characteristic values: Saponification number=1.3, acid number=0, hydroxyl number=213, iodine number=99, and content of unsulfonatable matter=1.1%. The yield was 98.5% of the theoretical yield.

While I have given several specific embodiments of my invention, persons skilled in the art will readily recognize that the present invention is not limited to these embodiments and that various changes and modification may be made therein without departing from the spirit of the invention or the scope of the appended claims.

In my copending application Serial No. 810,990, which is a continuation-in-part of my previously filed application Serial No. 494,821, now abandoned, I disclose a method for producing aliphatic saturated fatty alcohols from esters of saturated fatty acids by hydrogenation. The processes are however distinct in that they vary in products, starting materials and reaction conditions. In the present application, the products and starting materials are unsaturated; a large quantity of low activity zinc catalyst is used (about 8 liters/liter of feed/hour), the catalyst quantity may also be expressed in terms of throughput; and a low throughput is used (2 to 4 times the catalyst body per 24 hours, thus the volume of catalyst utilized is from 6 to 12 times the hourly volume of feed material). In the copending application, the starting materials are saturated or unsaturated respectively whereas the reaction products are constantly saturated; a relatively small amount of a high activity copper containing catalyst is used (about 1.5 liters/liter of feed/hour); and a high throughput is used in proportion to the catalyst body (about 15 to 20 times the catalyst body per 24 hours).

I claim:

1. In a process of producing unsaturated fatty alcohols by catalytic reduction of unsaturated fatty materials selected from the group consisting of unsubstituted unsaturated fatty higher acids, and their esters formed with lower alkyl alcohols containing from 1 to 4 carbon atoms, the steps of passing a reaction mixture consisting essentially of at least one of said unsaturated fatty materials, a lower alkyl alcohol containing from 1 to 4 carbon atoms in an amount corresponding to from 1 to 5 times the volume of unsaturated fatty materials and hydrogen in an amount corresponding to at least 50 to 500 times the stoichiometrically required molar quantity, in the vapor phase, through a reaction space containing a contact catalyst of low activity in lump form, said catalyst being selected from the group consisting of zinc-chromium, zinc-barium-chromium, zinc-cadmium-chromium, zinc-magnesium-chromium, zinc-vanadium, cadmium-vanadium, zinc-cadmium-vanadium, and zinc-cadmium-barium-vanadium catalysts, the volume of said catalyst being from 6 to 12 times the hourly volume of feed material, at a temperature from 250 to 350° C. and at a pressure of at least 100 to 500 atmospheres gauge, and separating the unsaturated fatty alcohols formed thereby from the lower alkyl alcohol.

2. The process of claim 1 wherein the starting material is a lower alkyl ester of a higher fatty acid and the added lower alkyl alcohol is the same as that used to form the ester.

3. The process of claim 1 wherein the starting material is oleic acid.

4. The process of claim 1 wherein the starting material is tallow oil fatty acid.

5. The process of claim 1 wherein the starting material is sperm oil fatty acid.

6. The process of claim 1 wherein the starting material is cotton oil fatty acid.

7. The process of claim 1 wherein the starting material is sperm oil fatty acid methyl ester.

8. In a process of producing unsaturated fatty alcohols by catalytic reductions of unsaturated fatty materials selected from the group consisting of unsubstituted unsaturated higher fatty acids and their esters formed with lower alkyl alcohols containing from 1 to 4 carbon atoms, the steps of passing a reaction mixture consisting essentially of at least one of said unsaturated fatty materials and methanol in an amount corresponding to from 1 to 5 times the volume of unsaturated fatty materials and hydrogen in an amount corresponding to at least 50 to 500 times the stoichiometrically required molar quantity, in the vapor phase, through a reaction space containing a contact catalyst of low activity in lump form, said catalyst being selected from the group consisting of zinc-chromium, zinc-barium-chromium, zinc-cadmium-chromium, zinc-magnesium-chromium, zinc-vanadium, cadmium-vanadium, zinc-cadmium-vanadium, and zinc-cadmium-barium-vanadium catalysts, the volume of catalyst being 6 to 12 times the hourly volume of feed material, at a temperature from 250 to 350° C. and at a pressure of between about 100 to 500 atmospheres gauge, and separating the unsaturated fatty alcohols formed thereby from the lower alkyl alcohol.

9. In a process of producing unsaturated fatty alcohols by catalytic reduction of unsaturated fatty materials selected from the group consisting of unsubstituted unsaturated higher fatty acids and their esters formed with lower alkyl alcohols containing from 1 to 4 carbon atoms, the steps of forming a reaction mixture consisting essentially of at least one of said unsaturated fatty materials and a lower alkyl alcohol containing from 1 to 4 carbon atoms in an amount corresponding to from 1 to 5 times the volume of unsaturated fatty materials, passing an excess of hydrogen in an amount corresponding to from about 50 to 500 times the stoichiometrically required molar quantity in contact with said mixture to form a vapor phase, and passing said vapor phase through a reaction space containing a low activity hydrogenation catalyst in lump form, said catalyst being selected from the group consisting of zinc-chromium- zinc-barium-chromium, zinc-cadmium-chromium, zinc-magnesium-chromium, zinc-vanadium, cadmium-vanadium, zinc-cadmium-vanadium, and zinc-cadmium-barium-vanadium catalysts, in an amount corresponding to 6 to 12 times the hourly rate of feed material at a temperature from 250 to 350° C. and at a pressure of between about 100 to 500 atmospheres, gauge, and separating the unsaturated fatty alcohols formed thereby from the lower alkyl alcohol.

References Cited by the Examiner

UNITED STATES PATENTS 2,374,379    4/45    Rittmeister.

OTHER REFERENCES

Adams et al.: Organic Reactions, vol. VIII, pages 10–12, 23 (1954).

LEON ZITVER, *Primary Examiner.*

CHARLES B. PARKER, *Examiner.*